United States Patent
Asai et al.

(10) Patent No.: US 11,915,845 B2
(45) Date of Patent: Feb. 27, 2024

(54) METHOD FOR PRODUCING RARE EARTH SINTERED MAGNET

(71) Applicant: Shin-Etsu Chemical Co., Ltd., Tokyo (JP)

(72) Inventors: Taiga Asai, Echizen (JP); Akira Fujimoto, Echizen (JP); Tetsuya Ohashi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/873,791

(22) Filed: Jul. 26, 2022

(65) Prior Publication Data
US 2023/0066157 A1  Mar. 2, 2023

(30) Foreign Application Priority Data
Aug. 18, 2021 (JP) ................... 2021-133243

(51) Int. Cl.
| | |
|---|---|
| *H01F 41/02* | (2006.01) |
| *H01F 1/057* | (2006.01) |
| *C22C 38/00* | (2006.01) |
| *C22C 38/06* | (2006.01) |
| *C22C 38/10* | (2006.01) |
| *C22C 38/16* | (2006.01) |
| *C23C 12/02* | (2006.01) |

(52) U.S. Cl.
CPC ......... *H01F 1/0577* (2013.01); *C22C 38/005* (2013.01); *C22C 38/06* (2013.01); *C22C 38/10* (2013.01); *C22C 38/16* (2013.01); *C23C 12/02* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 2003/0232132 A1 | 12/2003 | Muehlberger | |
| 2007/0248832 A1* | 10/2007 | Maeda | ............ C23C 4/06 428/457 |
| 2008/0245442 A1 | 10/2008 | Nakamura et al. | |
| 2009/0020193 A1 | 1/2009 | Ohta et al. | |
| 2017/0062104 A1 | 3/2017 | Diao et al. | |
| 2017/0076846 A1* | 3/2017 | Tsukamoto | ............ H01F 7/021 |
| 2018/0204677 A1* | 7/2018 | Celik | ............ C22C 38/005 |
| 2019/0214191 A1 | 7/2019 | Kuniyoshi et al. | |

FOREIGN PATENT DOCUMENTS

| | | |
|---|---|---|
| WO | WO 2006/043348 A1 | 4/2006 |
| WO | WO 2006/112403 A1 | 10/2006 |
| WO | WO 2018/062174 A1 | 4/2018 |

OTHER PUBLICATIONS

Extended European Search Report for European Application No. 22187126.2, dated Jan. 5, 2023.
Moridi et al., "Cold Spray Coating: Review of Material Systems and Future Perspectives", Surface Engineering, vol. 36, No. 6, 2014, pp. 369-395.

* cited by examiner

*Primary Examiner* — Xiaowei Su
(74) *Attorney, Agent, or Firm* — Birch, Stewart, Kolasch & Birch, LLP

(57) ABSTRACT

A rare earth sintered magnet is produced by depositing a coating of rare earth-containing particles on the surface of a rare earth magnet body, and heat treating the magnet body for causing absorption and diffusion of rare earth element in the magnet body. The depositing step utilizes a particle impingement phenomenon.

6 Claims, No Drawings

METHOD FOR PRODUCING RARE EARTH SINTERED MAGNET

CROSS-REFERENCE TO RELATED APPLICATION

This non-provisional application claims priority under 35 U.S.C. § 119(a) on Patent Application No. 2021-133243 filed in Japan on Aug. 18, 2021, the entire contents of which are hereby incorporated by reference.

TECHNICAL FIELD

This invention relates to a method for effectively producing rare earth magnet having excellent magnetic properties.

BACKGROUND ART

Rare earth magnets including R—Fe—B base magnets are a class of functional material which is essential for energy saving and greater functionality. Their application range and production quantity are annually expanding. They are used, for example, in drive motors in hybrid cars and electric vehicles, motors in electric power steering systems, motors in air conditioner compressors, and voice coil motors (VCM) in hard disk drives.

For further enhancing the magnetic properties of rare earth magnets, Patent Document 1 discloses a method comprising the steps of coating the surface of a magnet body with rare earth compound particles and heat treating the coated magnet body to cause absorption and diffusion of rare earth element in the magnet body, the method being referred to as grain boundary diffusion method, hereinafter. With this method, coercivity can be increased while suppressing a drop of remanence (or residual magnetic flux density). Heretofore, the grain boundary diffusion method is generally implemented by dispersing a rare earth compound-containing powder in water or organic solvent to form a slurry, and immersing a magnet body in the slurry for thereby coating the magnet body with rare earth compound-containing powder. Such a wet method is difficult to control variations in coating weight and coating thickness of the powder.

Patent Document 2 describes a method comprising the steps of forming a RHM alloy layer on the surface of a R—Fe—B base sintered magnet body, the RHM alloy layer containing RH which is one or more rare earth elements selected from Dy, Ho, and Tb and metal M which is one or more metal elements selected from Al, Cu, Co, Fe and Ag, and then conducting grain boundary diffusion. Sputtering is applied to the formation of the RHM alloy layer.

In Patent Document 3, an alloy powder serving as a source for grain boundary diffusion is attached to the surface of a magnet body which has been coated with a pressure-sensitive adhesive, and the coated magnet body is heat treated. The alloy powder is effectively and uniformly distributed on the magnet surface without loss. A magnet having improved magnetic properties is obtained.

Citation List
Patent Document 1: WO 2006/043348
Patent Document 2: WO 2006/112403
Patent Document 3: WO 2018/062174

SUMMARY OF INVENTION

The grain boundary diffusion method utilizing sputtering as disclosed in Patent Document 2 has some advantages, for example, a uniform coating of the diffusion source can be formed, variations in magnetic properties are reduced, and magnetic properties are largely improved. However, an excess of the rare earth element can be diffused from the diffusion source into the magnet body. It is difficult to recover for reuse the diffusion source which has not been deposited on the destination or magnet body, Since the sputtering step needs a high vacuum, many difficulties arise from the manufacture aspect.

The method of spraying the powder or diffusion source to the magnet body as disclosed in Patent Document 3 suffers from several problems despite the advantage of reduced process load. For example, the diffusion efficiency of rare earth element during grain boundary diffusion, which is most important, is low. The process stability is low. The pressure-sensitive adhesive for attaching the powder leaves noticeable impurities.

An object of the invention is to provide a method for producing rare earth sintered magnet through grain boundary diffusion, with advantages including small process load, high productivity, and improved magnetic properties with minimal variations.

Studying how to form a coating of powder serving as a diffusion source for grain boundary diffusion and the density of the coating, the inventors have found that when a coating of powder is deposited by a method utilizing a particle impingement phenomenon such as aerosol deposition method, a rare earth sintered magnet having improved magnetic properties can be produced in a highly productive way.

The invention provides a method for producing rare earth sintered magnet comprising the steps of depositing a coating of R-containing particles on at least a portion of the surface of a rare earth magnet body, and heat treating the magnet body for causing absorption and diffusion of R in the magnet body, R being at least one element selected from rare earth elements, wherein the depositing step relies on a method utilizing a particle impingement phenomenon.

In a preferred embodiment, the method utilizing a particle impingement phenomenon is to force the R-containing particles to impinge on the rare earth magnet body under the impetus of a differential pressure between the internal pressure of a chamber where the magnet body is held in place and the pressure of a supply for supplying the R-containing particles to the chamber.

Typically, the method utilizing a particle impingement phenomenon is an aerosol deposition method.

In a preferred embodiment, the R-containing coating has a density which is at least 40% of the true density of the R-containing particles.

ADVANTAGEOUS EFFECT OF INVENTION

According to the invention, a coating of a diffusion source is deposited on the surface of a magnet body by a method utilizing a particle impingement phenomenon, thereby perform grain boundary diffusion. This meets both improved magnetic properties and a high productivity.

DESCRIPTION OF PREFERRED EMBODIMENTS

The invention provides a method for efficiently producing a rare earth sintered magnet having improved magnetic properties, comprising the steps of depositing a R-containing coating on at least a portion of the surface of a rare earth magnet body, and heat treating the magnet body for causing absorption and diffusion of R in the magnet body, Notably, R is at least one element selected from rare earth elements.

The starting rare earth magnet body is typically of $R^1$—Fe—B base composition wherein $R^1$ is at least one element selected from rare earth elements, preferably essentially contains at least one of Pr and Nd. The rare earth magnet body may be obtained in a conventional way from a mother alloy through the steps of coarse pulverization, fine pulverization, compaction, and sintering.

Specifically, the mother alloy contains $R^1$, T, M, and B. $R^1$ is at least one element selected from rare earth elements, preferably essentially contains Pr and/or Nd. Exemplary rare earth elements include Sc, Y, La, Ce, Pr, Nd, Sm, Eu, Gd, Tb, Dy, Ho, Er, Tm, Yb, and Lu. Preferably $R^1$ is composed mainly of Pr and/or Nd. The content of $R^1$ is preferably 12 to 17 at %, more preferably 13 to 17 at % of the overall alloy. Preferably at least one of Pr and Nd accounts for at least 80 at %, more preferably at least 85 at % of overall $R^1$. T is Fe, or Fe and Co. When T is a mixture of Fe and Co, Fe preferably accounts for at least 85 at %, more preferably at least 90 at % of overall T. M is at least one element selected from the group consisting of Al, Si, Cu, Zn, In, P, S, Ti, V, Cr, Mn, Ni, Ga, Ge, Zr, Nb, Mo, Pd, Ag, Cd, Sn, Sb, Hf, Ta, and W. The content of M is preferably 0 to 10 at %, more preferably 0.05 to 4 at % of the overall alloy. The content of B or boron is preferably 5 to 10 at %, more preferably 5 to 7 at % of the overall alloy, Besides the foregoing elements, the alloy may contain incidental impurities or intentional additives such as C, N, O and F.

The mother alloy is prepared by melting a raw metal or alloy material in vacuum or inert gas, preferably in Ar atmosphere and casting the melt in a flat mold or book mold, or strip casting. Also applicable herein is a so-called two-alloy technique involving separately furnishing an alloy approximate to the $R_2Fe_{14}B$ compound composition that constitutes the main phase and an R-rich alloy serving as liquid phase aid at the sintering temperature, crushing, then weighing and mixing them. Notably, the alloy approximate to the main phase composition has a tendency that α-Fe primary crystal grains remain depending on the cooling rate during casting and the alloy composition. Thus homogenizing treatment is preferably carried out for the purpose of increasing the amount of $R_2Fe_{14}B$ compound phase in the mother alloy. For example, the mother alloy is heat treated in vacuum or Ar atmosphere at 700 to 1,200° C. for at least 1 hour. To the R-rich alloy serving as liquid phase aid, not only the casting technique mentioned above, but also the so-called melt quenching technique are applicable.

The mother alloy is typically coarsely pulverized to a particle size of 0.05 to 3 mm, preferably 0.05 to 1.5 mm. In the coarse pulverizing step, grinding on a Brown mill or hydrogen decrepitation may be used. To the mother alloy prepared by strip casting, preferably hydrogen decrepitation is applicable. The coarse powder is then finely pulverized, for example, on a jet mill using high-pressure nitrogen, typically to a particle size of 0.1 to 30 μm, preferably 0.2 to 20 μm.

The fine powder is compression shaped into a compact by a compression shaping machine while applying a magnetic field of 400 to 1,600 kA/m for orienting or aligning powder particles in the direction of axis of easy magnetization. The compact is transferred into a sintering furnace. The compact is sintered in vacuum or inert gas atmosphere, at a sintering temperature of typically 900 to 1,250° C., especially 1,000 to 1,100° C. The sintered block typically contains 60 to 99% by volume, preferably 80 to 98% by volume of tetragonal $R_2Fe_{14}B$ compound as the main phase. The balance consists of 0.5 to 20% by volume of $R^1$-rich phase (containing at least 25 at % of $R^1$), 0 to 10% by volume of B-rich phase, and 0.1 to 10% by volume of phases of $R^1$ oxide and at least one compound selected from the group consisting of carbides, nitrides, hydroxides, and fluorides of incidental impurities, or mixtures or composites thereof.

The sintered magnet block thus obtained is ground to a desired shape, after which the rare earth magnet body is subjected to the grain boundary diffusion step to be described below. The size of the rare earth magnet body is not particularly limited. The amount of R which is absorbed in the magnet body during the grain boundary diffusion step increases as the magnet body has a larger specific surface area, i.e., a smaller size. When it is desired to acquire an increase of coercivity of the overall magnet, the sintered magnet body preferably has a size of up to 100 mm, especially up to 50 mm in the largest section of its shape, and a size of up to 30 mm, especially up to 15 mm in the magnetically anisotropic direction. The lower limits of the size of the largest section and the size in the magnetically anisotropic direction of the sintered magnet body are not critical. The size of the largest section of the sintered magnet body is preferably at least 1 mm, and the size in the magnetically anisotropic direction of the sintered magnet body is preferably at least 0.5 mm. When it is desired to acquire an increase of coercivity only at a certain site (e.g., a surface layer or corners) of the magnet, no limits are imposed on the size of the sintered magnet body.

In the grain boundary diffusion step, a coating of R-containing particles is deposited on at least a portion of the surface of the rare earth magnet body by a method utilizing a particle impingement phenomenon. Although the method utilizing a particle impingement phenomenon is not particularly limited, preference is given to a method utilizing a differential pressure between the internal pressure of a chamber where the rare earth magnet body is held in place and the pressure of a supply for supplying the R-containing particles to the chamber, for thereby forcing the R-containing particles to impinge on the magnet body. For example, an aerosol deposition method and a cold spray method are applicable, with the aerosol deposition method being preferred.

The aerosol deposition method involves mixing fine particles of coating material with a gas, and dispersing to form an aerosol, and injecting the aerosol through a nozzle for thereby impinging fine particles against the designation or substrate. The conversion of kinetic energy upon impingement causes to bond fine particles together or to the substrate. A coating of R-containing particles is formed on the designation or substrate.

The deposition step of the aerosol deposition method is characterized in that a coating of the desire material can be formed at normal temperature. The deposited coating has a sufficient mechanical strength. The properties (e.g., coating density, coating weight, microscopic structure, coating strength, etc.) of the deposited coating can be controlled by adjusting the conditions under which fine particles are injected against the substrate and the states (composition, particle size, shape, etc.) of fine particles for coat-forming material. As used herein, the term "normal temperature" refers to a temperature which is fully lower than the melting point of fine particles for coat-forming material, specifically a temperature which is fully lower than the sintering temperature of rare earth magnet body, typically 0 to 100° C., especially room temperature in the range of 20° C.±10° C.

The powdered material of which a coating to be deposited on the surface of the rare earth magnet body is made contain a powder of R-containing fine particles. R is at least one element selected from rare earth elements. Of the rare earth elements, Dy, Tb and Ho are preferred. The R-containing fine particles include particles of R-containing metals, R alloys, and R compounds. Preference is given to at least one member selected from R-containing metals, R alloys, R oxides, R fluorides, and R oxyfluorides. The fine particles preferably have a median diameter of up to 10 μm, more preferably up to 5 μm, even more preferably up to 2 μm, most preferably up to 1 μm, as measured by the laser diffractometry. The particle size is not limited to this range as long as a desired coating density to be described later is achievable, namely a larger particle size is acceptable.

The apparatus used in coating formation by the aerosol deposition method is not particularly limited and any commercially marketed apparatus may be used. The apparatus basically includes a deposition chamber, an aerosol-creating section, and a gas supply. For example, a stage on which the rare earth magnet body is rested and a nozzle for injecting the aerosol are disposed in the chamber. The relative position of the rare earth magnet body resting on the stage and the nozzle may be changed as desired. Then a coating can be deposited on the desired area.

The gas used in coating formation by the aerosol deposition method is selected, for example, from nitrogen gas, argon gas, air and helium gas. When the gas used is air, air from which impurities such as moisture have been removed is preferred.

The coating deposition in the apparatus is carried out as follows. The rare earth magnet body is rested on the stage in the deposition chamber. A vacuum pump is operated to evacuate the chamber to a sub-atmospheric pressure. The internal pressure of the aerosol-creating section is set higher than the internal pressure of the deposition chamber. The internal pressure of the aerosol-creating section is generally several hundred to several ten thousand Pa, though not limited thereto. The setting establishes a differential pressure between the deposition chamber and the aerosol-creating section, under the impetus of which the powder or aerosol is injected through the nozzle. The conditions (e.g., amount and speed) under which the powder is injected are adjusted as appropriate, specifically by controlling the flow rate and type of gas feed, and the shape of the nozzle. Although the setting in the above example is such that the internal pressure of the deposition chamber is sub-atmospheric and the internal pressure of the aerosol supply is higher than the chamber pressure, the setting is not limited thereto as long as a differential pressure is established between the deposition chamber and the aerosol supply.

The coating formed by the aerosol deposition method may be a coating having desired characteristics, which varies from a porous coating like a powder compact to a dense coating composed of grains having a small crystallite size, by changing the deposition conditions under which fine particles are deposited on the rare earth magnet body and the state of fine particles in the powder of raw material.

Even when the coating formed by the aerosol deposition method is a porous coating like a powder compact, it has a bond strength enough not to be separated by manual touch. The coating has a density which is preferably at least 40%, more preferably 50 to 70% of the true density of the powder. The range of coating density ensures both consistent improvements in magnetic properties and high productivity. The density may be computed as the coating weight W (a change of weight of the rare earth magnet body before and after coating deposition), divided by deposition area A, divided by coating thickness "t", i.e., W/A/t.

In the aerosol deposition method, the vacuum pump is operated to evacuate the chamber interior to sub-atmospheric pressure, whereupon deposition is performed in an atmosphere of several hundred Pa. Since this range of pressure is a low (or moderate) degree of vacuum as compared with other means such as sputtering, an improvement in productivity is expectable. Additionally, since the powder used as the raw material is free of binders or adjuvants, the remainder of the powder which has not contributed to coating deposition can be recovered for reuse.

Next, the rare earth magnet body covered with the R-containing coating is heat treated for causing R to be absorbed and diffused in the magnet body. The conditions of heat treatment are not particularly limited and may be the same as the conventional grain boundary diffusion step. Specifically, the magnet body is heat treated in vacuum or inert gas atmosphere such as Ar or He, at a temperature lower than the sintering temperature, preferably 600 to 1,050° C., more preferably 700 to 1,025° C., even more preferably 750 to 1,000° C. The treatment time is preferably 5 minutes to 80 hours, more preferably 10 minutes to 50 hours, in view of better sintered magnet structure and magnetic properties. Through the grain boundary diffusion, R in the powder is diffused into the magnet body for achieving an increase of coercivity Hcj.

The heat treatment may be followed by a post treatment, i.e., aging treatment. The aging treatment conditions include a temperature of preferably at least 400° C., more preferably at least 430° C., and preferably up to 600° C., more preferably up to 550° C. and a time of preferably at least 30 minutes, more preferably at least 1 hour, and preferably up to 10 hours, more preferably up to 5 hours. The aging treatment atmosphere is vacuum or inert gas atmosphere such as Ar gas.

EXAMPLES

Examples are given below for further illustrating the invention although the invention is not limited thereto.

Example 1

A thin plate of alloy was prepared by a so-called strip casting method, specifically by weighing amounts of Nd, Co, Al, Fe and Cu metals having a purity of at least 99 wt %, and ferroboron, high-frequency heating in argon atmosphere for melting, and casting the alloy melt on a copper single roll. The resulting alloy consisted of 14.5 at % Nd, 2.0 at % Co, 0.5 at % Al, 0.2 at % Cu, 6.1 at % B, and the balance of Fe. The alloy was exposed to 0.11 MPa of hydrogen at room temperature for hydrogen absorption, and then heated at 500° C. for partial dehydriding while evacuating to vacuum (i.e., hydrogen decrepitation). It was cooled and sieved, obtaining a coarse powder having a size of up to 50 mesh.

On a jet mill using high-pressure nitrogen gas, the coarse powder was finely pulverized to a weight median particle size of 3.5 μm. The resulting fine powder was compacted in a nitrogen atmosphere under a pressure of about 100 MPa while being oriented in a magnetic field of 1.2 MA/m. The compact was then placed in a sintering furnace of argon atmosphere where it was sintered at 1,060° C. for 2 hours, obtaining a sintered magnet block. Using a diamond cutter, the magnet block was machined on all the surfaces, cleaned with alkaline solution, pure water, nitric acid and pure water in sequence, and dried, obtaining a rare earth magnet body of 16 mm×30 mm×3.2 mm thick (in orientation direction). The magnet body was measured for coercivity at room temperature by a pulse tracer (Toei Industry Co., Ltd.), finding a coercivity of 13 kOe.

Next, a coating of terbium oxide (UUHP grade, average particle size 0.2 μm, Shin-Etsu Chemical Co., Ltd.) was deposited on the rare earth magnet body by the aerosol deposition method. Specifically, an aerosol gas deposition (ACID) system (GD-AE031/SK by Fuchita Nanotech Co., Ltd.) was used. For aerosol deposition, 25 g of terbium oxide was first set on the aerosol-creating section of the AGD system. The rare earth magnet body was rested on a stage in the chamber such that the magnet body was spaced a distance of 25 mm from the nozzle. By operating a rotary pump and mechanical booster pump, the chamber was evacuated to 2.0 Pa. Terbium oxide particles were deposited while scanning the stage at a speed of 5 mm/sec. A coating of terbium oxide particles was deposited on the front surface of the rare earth magnet body, having a density of 4.2 mg/mm$^3$, which corresponded to 58% of the true density of terbium oxide. Similarly, a coating was deposited on the surface of the magnet body opposed to the front surface. The magnet body having terbium oxide coatings on both the opposed surfaces was transferred to a heat-treating furnace where it was heat treated in vacuum at 875° C. for 20 hours and further at 490° C. for 2 hours, yielding a sintered rare earth magnet. The magnet was analyzed by the pulse tracer to find a coercivity of 21 kOe, indicating a coercivity increase of 8 kOe over the magnet body prior to the coating deposition.

In a further run, three magnet bodies were similarly prepared. Coating deposition and heat treatment were carried out as above. A coating density and coercivity were measured. The results are shown in Table 1 together with the results of Comparative Examples 1 and 2 to be described below. As seen from Table 1, coatings having minimal variation or high uniformity could be formed within a short evacuation time and a short deposition time.

Comparative Example 1

A rare earth magnet body was prepared by the same method as in Example 1. A coating of terbium oxide was deposited on the magnet body by a sputtering method. Specifically, sputtering was carried out by using equipment EB1000 (Canon Anelva Corp.), a terbium oxide target, a RF power source of 200 W, and a target-sample distance of 60 mm. A chamber pressure was adjusted by operating a rotary pump and turbo molecular pump to evacuate the chamber to 5.0×10$^{-4}$ Pa, and feeding Ar to restore a pressure of 1 Pa. Deposition was carried out under stationary opposed conditions. A coating of terbium oxide deposited on the front surface of the magnet body had a density of 6.9 mg/mm$^3$, which corresponded to 95% of the true density of terbium oxide. Similarly, a coating was deposited on the surface of the magnet body opposed to the front surface. The magnet body was then heat treated as in Example 1. On analysis by the pulse tracer, the magnet had a coercivity of 21 kOe, corresponding to a coercivity increase of 8 kOe over the magnet body prior to the coating deposition.

In a further run, three magnet bodies were similarly prepared. Coating deposition and heat treatment were carried out as above. A coating density and coercivity were measured. The results are shown in Table 1. As seen from Table 1, these coatings have small variations, but need a very long evacuation time and deposition time.

Comparative Example 2

A rare earth magnet body was prepared by the same method as in Example 1. An adequate amount of an aqueous solution of polyvinyl alcohol was applied to the magnet body, and terbium oxide particles were sprayed thereon. A coating of terbium oxide deposited on the magnet body had a density of 1.5 mg/mm$^3$, which corresponded to 21% of the true density of terbium oxide. The magnet body was then heat treated as in Example 1. On analysis by the pulse tracer, the magnet had a coercivity of 15.5 kOe, corresponding to a coercivity increase of 2.5 kOe over the magnet body prior to the coating deposition.

In a further run, three magnet bodies were similarly prepared. Coating deposition and heat treatment were carried out as above. A coating density and coercivity were measured. The results are shown in Table 1. As seen from Table 1, these coatings have noticeable variations of weight and density. Additionally, the coercivity increases of the magnets have noticeable variations, and the increases of coercivity are small.

TABLE 1

|  | Coating weight (μg/mm$^2$) | Coating density (%) | Coercivity increase (kOe) | Evacuation time (min) | Deposition time (s) |
|---|---|---|---|---|---|
| Example 1 | 100 | 57.5 | 8 | 2 | 6 |
|  | 99.5 | 56.2 | 8 | 2 | 6 |
|  | 100.1 | 58.1 | 8 | 2 | 6 |
| Comparative Example 1 | 100.1 | 94.5 | 8 | 30 | 4,200 |
|  | 100.3 | 95.9 | 8 | 30 | 4,200 |
|  | 99.8 | 95.2 | 8 | 30 | 4,200 |
| Comparative Example 2 | 50 | 20.5 | 2.5 | 0 | 6 |
|  | 100 | 27.4 | 3 | 0 | 6 |
|  | 150 | 24.7 | 2.4 | 0 | 6 |

Example 2

A coating was deposited on the rare earth magnet body by the same procedure as in Example 1 except that terbium fluoride was used as the powder. The coating deposited on the rare earth magnet body had a density of 4.5 mg/mm$^3$, which corresponded to 62% of the true density of terbium fluoride. The magnet body was heat treated as in Example 1. On analysis by the pulse tracer, the magnet had a coercivity of 21 kOe, corresponding to a coercivity increase of 8 kOe over the magnet body prior to the coating deposition.

Example 3

A coating was deposited on the rare earth magnet body by the same procedure as in Example 1 except that dysprosium oxide was used as the powder. The coating deposited on the rare earth magnet body had a density of 4.5 mg/mm$^3$, which corresponded to 58% of the true density of dysprosium oxide. The magnet body was heat treated as in Example 1. On analysis by the pulse tracer, the magnet had a coercivity of 18 kOe, corresponding to a coercivity increase of 5 kOe over the magnet body prior to the coating deposition.

Example 4

A coating was deposited on the rare earth magnet body by the same procedure as in Example 1 except that terbium oxide deposited in the chamber in Example 1 was recovered and reused as the coating-forming powder. The coating deposited on the rare earth magnet body had a density of 4.2 mg/mm$^3$, which corresponded to 58% of the true density of terbium oxide. The magnet body was heat treated as in Example 1. On analysis by the pulse tracer, the magnet had a coercivity of 21 kOe, corresponding to a coercivity increase of 8 kOe over the magnet body prior to the coating deposition.

Japanese Patent Application No. 2021-133243 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing rare earth sintered magnet comprising the steps of:
   depositing a coating of R-containing particles on at least a portion of a surface of a rare earth magnet body; and
   heat treating the magnet body for causing absorption and diffusion of R in the magnet body, R being at least one element selected from rare earth elements, wherein the depositing step relies on an aerosol deposition method in which the R-containing particles are forced to impinge on the rare earth magnet body under the impetus of a differential pressure between an internal pressure of a chamber where the magnet body is held in place and a pressure of a supply for supplying the R-containing particles to the chamber, and the deposited coating is a porous coating and has a density which is 40 to 70% of the true density of the R-containing particles.

2. The method of claim 1 wherein said R is at least one element selected from Dy, Tb, and Ho.

3. The method of claim 1 wherein the rare earth magnet body comprises $R^1$—Fe—B base composition, where $R^1$ is at least one element selected from Pr and Nd.

4. The method of claim 1 wherein in the step of heat treating, the magnet body is heat treated at temperature of 600 to 1,050° C.

5. The method of claim 1 wherein in the step of heat treating, the magnet body is heat treated at temperature of 600 to 1,050° C. and for 5 minutes to 80 hours.

6. The method of claim 1 wherein the aerosol deposition method is conducted by injecting an aerosol containing the R-containing particles through a nozzle to the surface of the rare earth magnet body at temperature of 0 to 100° C.

* * * * *